(12) United States Patent
Matte (10) Patent No.: US 6,244,227 B1
(45) Date of Patent: Jun. 12, 2001

(54) VALVE ASSEMBLY USING PRESSURIZED MEDIUM FOR CONTROLLING OPERATING CONDITIONS OF A TWO-STROKE ENGINE

(75) Inventor: Sylvain Matte, St-Denis de Brompton (CA)

(73) Assignee: Bombardier Inc., Montreal (CA)

( * ) Notice: Subject to any disclaimer, the term of this patent is extended or adjusted under 35 U.S.C. 154(b) by 0 days.

(21) Appl. No.: 09/206,073

(22) Filed: Dec. 4, 1998

(30) Foreign Application Priority Data

Dec. 5, 1997 (CA) .................................................. 2223770

(51) Int. Cl.$^7$ ...................................................... F02B 75/02
(52) U.S. Cl. .......................................................... 123/65 PE
(58) Field of Search ........................ 123/65 PE, 65 PD, 123/65 V, 65 P (56) References Cited

U.S. PATENT DOCUMENTS

| | | | |
|---|---|---|---|
| 4,364,346 | * 12/1982 | Shiohara | 123/323 |
| 4,723,514 | * 2/1988 | Taniuchi | 123/65 V |
| 4,813,391 | 3/1989 | Geyer et al. | 123/73 C |
| 4,966,104 | * 10/1990 | Hundleby | 123/65 BA |
| 5,588,402 | * 12/1996 | Lawrence | 123/65 PE |
| 5,873,334 | * 2/1999 | Heinrich | 123/65 PE |
| 5,934,958 | * 8/1999 | Ochiai | 440/89 |

* cited by examiner

Primary Examiner—Noah P. Kamen
Assistant Examiner—Hai Huynh
(74) Attorney, Agent, or Firm—Pillsbury Winthrop LLP (57) ABSTRACT

A valve assembly located adjacent the cylinder structure of a two-stroke engine including a valve piston, a diaphragm and a restricting member. The valve assembly is adapted to vary the height of the exhaust port of this type of engine by moving a restricting member, located in a guide channel communicating with the exhaust port, from a full-flow height position to a restrictive height position (and vice versa). The force necessary to actuate the restricting member is a pressurized medium or a vacuum. A solenoid valve controls the pressurized medium or vacuum delivery to the valve assembly according to the engine speed N and throttle opening for optimum efficiency.

50 Claims, 7 Drawing Sheets

VALVE ASSEMBLY USING PRESSURIZED MEDIUM FOR CONTROLLING OPERATING CONDITIONS OF A TWO-STROKE ENGINE

FIELD OF THE INVENTION

The invention relates to a valve assembly adapted to vary the height of the exhaust port of a two-stroke engine wherein a restrictive member is actuated by a pressurized medium or a vacuum for varying such height. In operation, the engine produces an engine speed N which is used for determining the height of the exhaust port in obtaining optimum efficiency of the engine.

BACKGROUND OF THE INVENTION

In order to ensure that two-stroke engines have a high power capacity at high speeds, a high volumetric efficiency is required and the charge losses must be minimized. This can be accomplished by an early and therefore higher opening of the exhaust passage. The adjustment of the exhaust port, to obtain maximum power capacity of the engine at high speeds involves, in the medium speed range, not only an appreciable decrease of the useful stroke, but also a large increase of the charge losses. As a result, the torque decreases and the specific fuel consumption increases greatly. A higher torque in conjunction with a lower fuel consumption can be obtained, at lower engine speeds, only if the opening of the exhaust port happens later in the down stroke of the piston which means that the exhaust port must be at a lower position than it is at high engine speeds.

For this purpose it is known to provide, in the exhaust port, a restricting member which has at its end, disposed adjacent the exhaust port, a restricting edge which, in the restricted position of the restricting member, is substantially flush with the peripheral surface of the cylinder bore. In this restricted position, the exhaust port is effectively lowered in relation to the down stroke of the piston. The restricting member is adjustable to vary the relative height of the exhaust port as is required by the given operating conditions of the engine.

U.S. Pat. No. 4,399,788, entitled "INTERNAL COMBUSTION ENGINE COMPRISING MEANS FOR CONTROLLING THE AXIAL EXTENT OF AN EXHAUST PORT IN A CYLINDER", discloses a system comprising a valve having a restricting member which is actuated by the exhaust gas pressure developed by the engine in the exhaust gas system. It is said that the exhaust gas pressure in the exhaust system is a variable which depends on all significant parameters for the positioning of the restricting member and that the exhaust gas pressure can be used to control the adjustment of the restricting member.

More particularly, the valve comprises a diaphragm for adjusting the restricting member which is gripped in the valve housing and engages a linkage, which is connected to the restricting member. A pressure-applying duct is connected to the exhaust gas system and is adapted to direct the exhaust gas pressure to the diaphragm. A return spring opposes the action of the exhaust gas pressure on the diaphragm and tends to move the restricting member into its restrictive position. A mechanical switch is also provided which renders the valve responsive to exhaust gas pressure only when the throttle is fully opened for high torque when the engine is operating under full load condition.

One disadvantage of this system is that the exhaust gas temperature is very high. A high temperature resistant diaphragm is thus required. Exhaust gas is also very dirty because of its content of oil and fuel, the oil-fuel mixture condensation and the carbonisation which occurs during ignition. In time, this will inevitably create a malfunction of the valve.

Using a pressure source created in the exhaust system cannot be very accurate because of production tolerances. Exhaust pressure is a function of the tuning characteristics of the exhaust system and will be affected by the variations during production. Exhaust gas temperature will also affect the pressure and cause variations. Another disadvantage of this prior art system is that the spring necessary to maintain the restricting member in the restricted position must be calibrated precisely in order to obtain optimum opening point of the restricting member. Because a transitional zone between the exhaust pressure which initiates the movement of the restricting member and the exhaust pressure for which the exhaust port is fully exposed is created by the spring rate, a reduction in engine efficiency occurs during this transitional period.

Because this prior art system uses only exhaust gas pressure to actuate the restricting member and raise the opening of the exhaust port, it caters only to the engine performance when it is operating under full load condition. The exhaust port height adjustment is desirable for all engine load conditions at high revolutions (RPM). The benefit of exhaust port height adjustment is that above a specific combination of RPM and load condition (throttle opening), the engine loses power unless the exhaust gas are able to escape the combustion chamber earlier. The prior art systems is simply unable to prevent power loss for 50% throttle opening combined with high revolutions which is a situation that occurs as often as wide open throttle combined with high revolutions. The exhaust gas pressure varying widely as a function of engine load, RPM, operating mode, ignition timing and exhaust pipe characteristics, and the prior art system being dependant on a single spring calibration for activating the restricting member, it is simply impossible for the prior art system to cater to a variety of RPM-load condition combinations.

Prior art systems using exhaust gas pressure encounter a further problem of hysteresis. When the restricting member opens the exhaust port, the exhaust gas pressure rises slightly which in effect, changes the closing point of the restricting member when the engine RPM falls back down. This phenomena alters engine performance negatively given that the activation point of the restricting member should be at the same RPM in acceleration or in deceleration.

Finally, this system requires the use of a larger diaphragm for two-stroke engines producing a lower pressure in their exhaust systems in order to generate the force needed to actuate the restricting member from the restrictive height position to the full flow height position and reach the goal of increasing engine efficiency.

It is also known to use a valve having a restricting member which is actuated and controlled by the pressuring mixture developed by the engine in the upper part of the cylinder. These systems have a major disadvantage in that the pressurized mixture from the cylinder is very hot and very dirty due to the carbonisation occurring during ignition. This can cause the restricting member and/or the measurement device to become clogged with soot. These systems also generate a transitional zone between two pressures where the efficiency of the engine is not optimum. These systems also use a calibrated spring for actuating the restricting member thereby encountering all the problems stated for the exhaust gas pressure activated systems.

Consequently, these prior art systems, in using a specific pressure as the sole controlling element for actuating the restricting member are less than optimum because they are based on a variable that is dependent on too many other variables. These prior art systems are limited to a very specific load condition. Even in that specific load condition, the movement of the restricting member is not initiated according to different engine speeds (RPM) as it should be, but according to the pressure created in the exhaust pipe or in the upper part of the cylinder which are variables that only partially depend on engine speed amongst other variables.

Moreover, these systems, because they operates according to a specific actuating pressure, require the use of different calibrated return springs for engines developing different power outputs.

Thus there is a need in the industry to provide an exhaust port height adjustment system that alleviates the problems encountered by prior art system and is adapted to cater to any and all engine load conditions.

OBJECTS AND STATEMENT OF THE INVENTION

One object of the invention is to provide an exhaust port height adjustment valve assembly for a two-stroke engine that is controlled according to engine speed (RPM).

Another object of the invention is to provide an exhaust port height adjustment valve assembly for a two-stroke engine that is controlled according to engine speed (RPM) and throttle opening.

It is another object of the invention to provide an exhaust port height adjustment valve assembly for a two-stroke engine that is controlled according to engine speed (RPM), throttle opening and rate of acceleration.

Another object of the invention is to provide an exhaust port height adjustment valve assembly for a two-stroke engine that uses a pressurized medium for varying the height of the exhaust port.

A further object of the invention is to provide a method for actuating pressure sensitive devices wherein a pressure source for actuating said pressure sensitive devices is an internal chamber defined by inside walls of an engine crankcase.

As embodied and broadly described herein, the invention provides an exhaust port height adjustment system comprising:

a valve assembly located adjacent said cylinder structure and including a restricting member mounted in said cylinder structure adjacent to said exhaust port and adjustable between a full-flow height, at which position said restricting member exposes said exhaust port throughout its axial extent, and a restrictive height, at which position said restricting member restricts the axial extent of said exhaust port, said valve assembly being connected to a pressure source, said pressure source producing a pressurized medium; wherein in operation, said valve assembly is adapted to actuate and control the position of said restricting member with said pressurized medium according to said engine speed N.

As embodied and broadly described herein, the invention also provides a two-stroke engine including:

a cylinder structure having an inside peripheral wall which defines a cylinder bore with an exhaust port;

a piston axially reciprocable in said cylinder bore and adapted to open and close said exhaust port;

a crankcase connected to said cylinder structure including an inside wall which defines an internal chamber;

said engine, in operation, producing an engine speed N; wherein the improvement comprises:

an exhaust port height adjustment system comprising:
a valve assembly located adjacent said cylinder structure and including a restricting member mounted in said cylinder structure adjacent to said exhaust port and adjustable between a full-flow height, at which position said restricting member exposes said exhaust port throughout its axial extent, and a restrictive height, at which position said restricting member restricts the axial extent of said exhaust port, said valve assembly being connected to a pressure source, said pressure source producing a pressurized medium; wherein in operation, said valve assembly is adapted to actuate and control the position of said restricting member with said pressurized medium according to said engine speed N.

In a preferred embodiment of the present invention the novel valve assembly includes a valve housing and a valve cover, a restricting member connected to a valve piston, a diaphragm mounted with the valve piston, and a compression spring. The restricting member is mounted in the cylinder structure adjacent the exhaust port and is adjustable between a full-flow height, at which the restricting member exposes the exhaust port throughout its axial extent, and a restrictive height, at which the restricting member restricts the upper portion of the exhaust port thereby restricting the axial extent of the exhaust port and delaying the exhaust port opening by the piston.

The valve assembly also includes a port in the valve housing, through which pressurized medium may enter or exit. A conduit is connected to the port in the valve housing which links the valve assembly to the pressurized air of the crankcase of the engine. This pressurized air, upon entering the valve assembly, applies pressure on the diaphragm of the valve assembly, thereby moving the restricting member towards the full-flow height position. In normal conditions, the compression spring maintains the restricting member in the restrictive height position.

A solenoid-valve is installed on the conduit linking the valve assembly to the pressurized air of the crankcase; such solenoid-valve directs or blocks the pressurized air to the diaphragm of the valve assembly thereby controlling the actuation of the restricting member. The solenoid-valve is itself controlled by a device such as an Electronic Control Unit (ECU), which measures amongst other parameters, the engine speed N produced by the engine when the latter is running, the load condition (throttle opening) of the engine and the acceleration and deceleration of the engine.

As the engine speed N (RPM) reaches and then exceeds a predetermined value, at a given load condition, the ECU will signal the solenoid-valve to open and let pressurized air from the crankcase enter into the valve assembly. The pressurized airwill generate enough force on the diaphragm and the valve piston to counter the force of the compression spring thereby displacing the restricting member of the valve assembly from the restrictive height position to the full-flow height position. Advantageously, a check valve is also installed on the conduit linking the valve assembly to the crankcase, upstream from the solenoid-valve. Since the crankcase produces pressurized air during the down-stroke of the engine and a vacuum pressure during the upstroke of the engine, the check valve is added to the system to regulate the pressure from the crankcase by letting pressurized air through, toward the solenoid-valve, and preventing any pressurized air from returning to the crankcase when a vacuum is created in the crankcase.

When the engine speed N (RPM) comes back down below the predetermined value, for a given load condition, the ECU signals the solenoid-valve to block the pressurized air from the crankcase. The force on the diaphragm and valve piston is no longer capable of countering the force of the compression spring and the restricting member of the valve assembly returns from the full-flow height position to the restrictive height position.

Advantageously, the ECU is programmed to measure the engine acceleration rate in order to open the solenoid-valve earlier than the predetermined N value when the acceleration rate of the engine is very high. Taking into account the time response of the valve assembly, if the acceleration rate is above a certain value, the pressurized air must be allowed to enter the valve assembly before the predetermined engine speed N in order for the restricting member to be actuated at the predetermined engine speed N on time. In this particular situation, failure to open the solenoid-valve earlier than at the predetermined engine speed N will result in an exhaust port not fully opened when the engine speed reach and exceed the predetermined N value.

As embodied and broadly described herein, the invention also provides a method for actuating pressure sensitive devices wherein a pressure source for actuating said pressure sensitive devices is an internal chamber defined by inside walls of an engine crankcase comprising the steps of:

1—operating engine to produce an engine speed N;
2—directing a pressurized medium from said internal chamber through a conduit, to said pressure sensitive devices;
3—calibrating said pressure sensitive devices to be activated at and above a predetermined pressure.

Other objects and features of the invention will become apparent by reference to the following specification and to the drawings.

BRIEF DESCRIPTION OF THE DRAWINGS

A detailed description of the preferred embodiment of the invention is provided herein with reference to the following drawings, wherein.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring now to the drawings, FIGS. 1 to 4 illustrate graphs of the engine power in kilowatts (lines 1 and 2) and the exhaust gas pressure (dotted lines 1A and 2A) as a function of engine speeds (RPM) for different load conditions (throttle opening). Line 1 represent the power curves of an engine with a low exhaust port height, whereas line 2 represent the power curves of an engine with a high exhaust port height. Dotted lines 1A and 2A represent the exhaust gas pressure associated with their numeral equivalent power curves.

Figure 1:
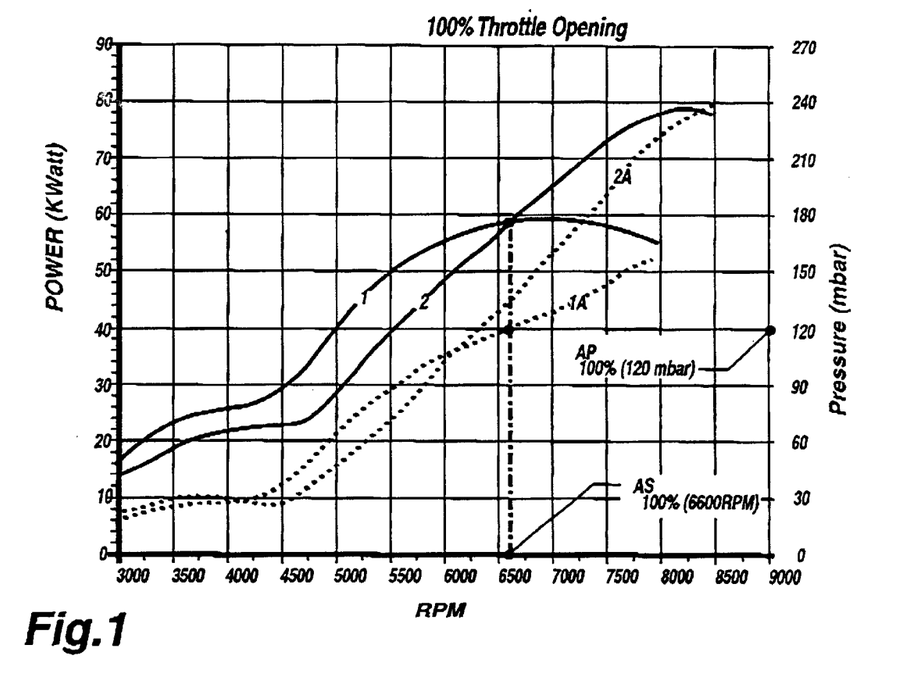
FIG. 1 is a graph showing the power curves of a two-stroke engine with a high exhaust port opening and of a two-stroke engine with a low exhaust port opening as a function of engine speed (RPM) in full line and their equivalent exhaust gas pressure in dotted line, for a 100% throttle opening.

FIG. 1 is a graph for 100% throttle opening specifically. It can be seen that the power output is higher for the engine with low exhaust port (line 1) at engine speeds below 6600 RPM. Above 6600 RPM, the engine featuring a high exhaust port produces more power. For an engine using exhaust port adjustment, FIG. 1 illustrates that, for 100% throttle opening, the ideal engine speed at which the height of the exhaust port should be increased is where the two power curves (lines 1 and 2) intersect each other at 6600 RPM, irrelevant of the exhaust gas pressure associated with their respective power curves (1A, 2A).

In order to increase engine efficiency, specific fuel consumption and total power output, an exhaust port height adjustment valve assembly is installed to combine the two power curves. To fully benefit from an exhaust port height adjustment valve assembly, the restricting member of the valve assembly should ideally be actuated at 6600 RPM (actuating speed of the engine for a 100% throttle opening ($AS_{100\%}$)) in order to permit a higher opening of the exhaust port Indeed, if no higher opening is allowed at that point, the engine will reach a power output of 60 KWatt (line 1 (restrictive height)) while if a higher opening is allowed, the engine will reach a power output of almost 80 KWatt (line 2 (full-flow height)).

Figure 2:
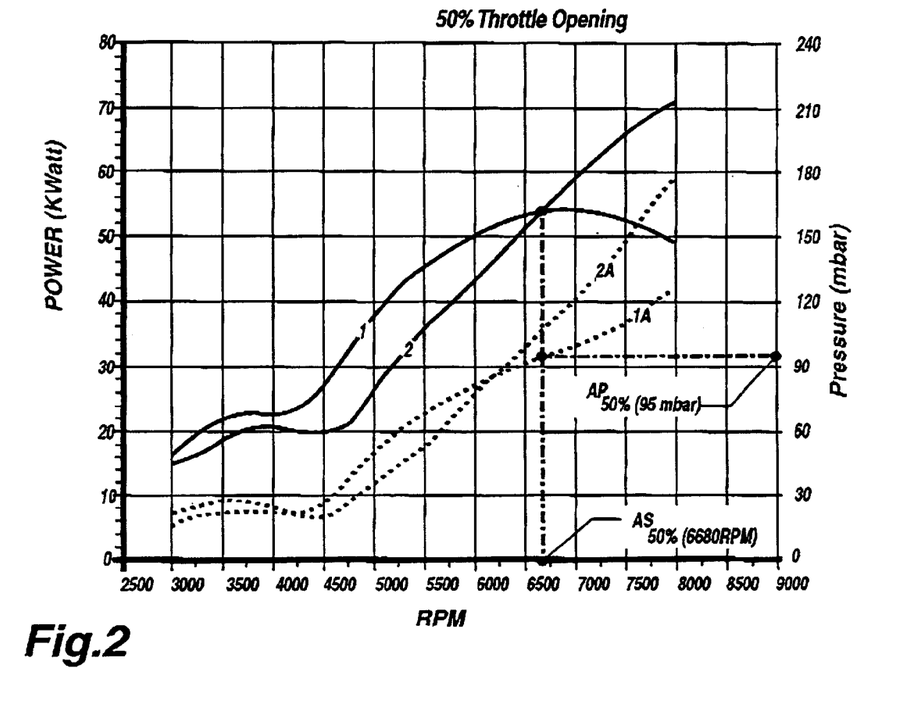
FIG. 2 is a graph showing the power curves of a two-stroke engine with a high exhaust port opening and of a two-stroke engine with a low exhaust port opening as a function of engine speed (RPM) in full line and their equivalent exhaust gas pressure in dotted line, for a 50% throttle opening.
Figure 3:
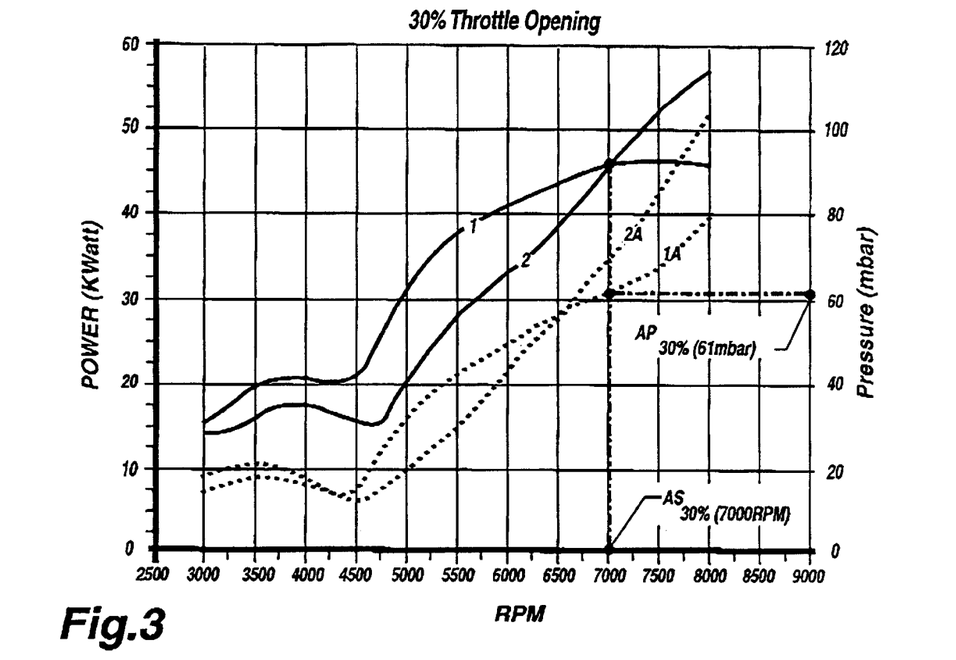
FIG. 3 is a graph showing the power curves of a two-stroke engine with a high exhaust port opening and of a two-stroke engine with a low exhaust port opening as a function of engine speed (RPM) in full line and their equivalent exhaust gas pressure in dotted line, for a 30% throttle opening.
Figure 4:
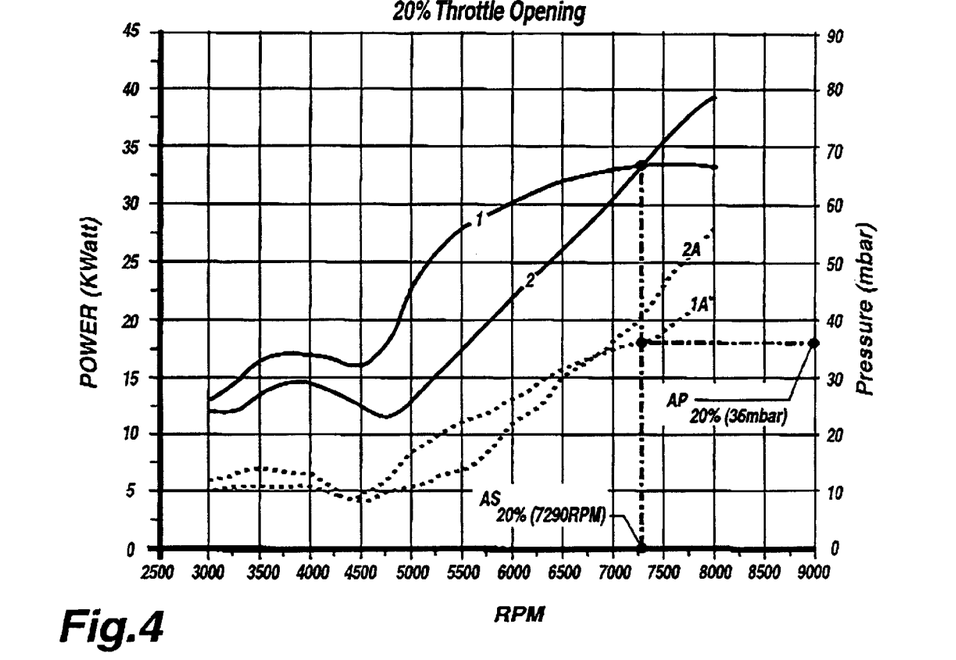
FIG. 4 is a graph showing the power curves of a two-stroke engine with a high exhaust port opening and of a two-stroke engine with a low exhaust port opening as a function of engine speed (RPM) in full line and their equivalent exhaust gas pressure in dotted line, for a 20% throttle opening.

As illustrated in FIG. 2, for a 50% throttle opening, the two power curves intersect when engine speed reaches 6680 RPM. Therefore, the restricting member of the exhaust port height adjustment valve assembly should be actuated at an engine speed of 6680 RPM ($AS_{50\%}$) in order to efficiently combine the two power curves. FIGS. 3 and 4, respectively illustrate that for a 30% throttle opening, the restricting member should be actuated at an engine speed of 7000 RPM ($AS_{30\%}$), and for a 20% throttle opening, the restricting member should be actuated at an engine speed of 7290 RPM ($AS_{20\%}$). It can be seen from these four graphs that the engine speed at which the restricting member of an exhaust port height adjustment valve assembly should be actuated, varies widely according to load condition (throttle opening).

Figure 5:
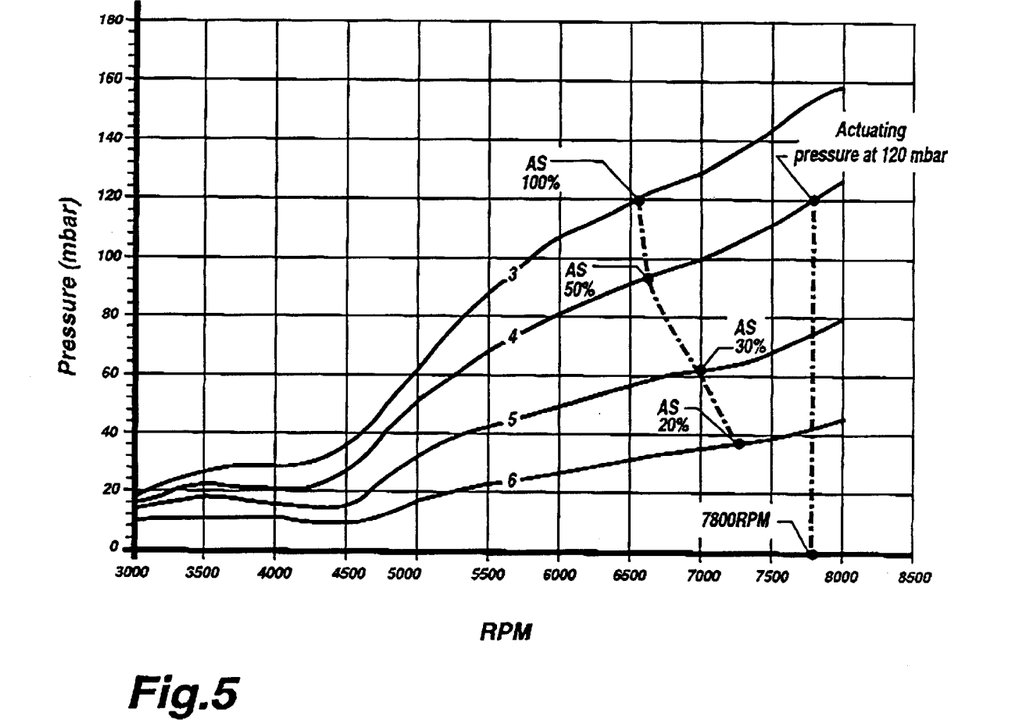
FIG. 5 is a graph showing curves which represent the relation of the available exhaust gas pressure according to engine speed (RPM) for different throttle opening.

If the exhaust gas pressure was used as the input to trigger the increase in exhaust port height, it would be impossible to cater to the different throttle openings depicted in FIGS. 1 to 4. Indeed, FIG. 5 illustrates four lines which represent the relationship of available exhaust pressures according to the engine speeds wherein lines 3, 4, 5 and 6 are respectively for a throttle opening of 100%, 50%, 30% and 20%. In using a return spring calibrated to a pressure of 120 mbar as dictated by a 100% throttle opening and illustrated by line 3, the restricting member would be actuated at the adequate engine speed of 6600 RPM ($AS_{100\%}$). However, the same return spring being used for all throttle openings; for a throttle opening of 50%, the exhaust pressure will reach 120 mbar at approximately 7800 RPM (see line 4) and only then would the restricting member initiate its movement instead of at the intersecting point of the two power curves of FIG. 2, i.e. 6680 RPM ($AS_{50\%}$). Finally, as illustrated by lines 5 and 6, the restricting member will never be actuated for these load conditions because the available exhaust gas pressure will never reach the pressure of 120 mbar.

Figure 6:
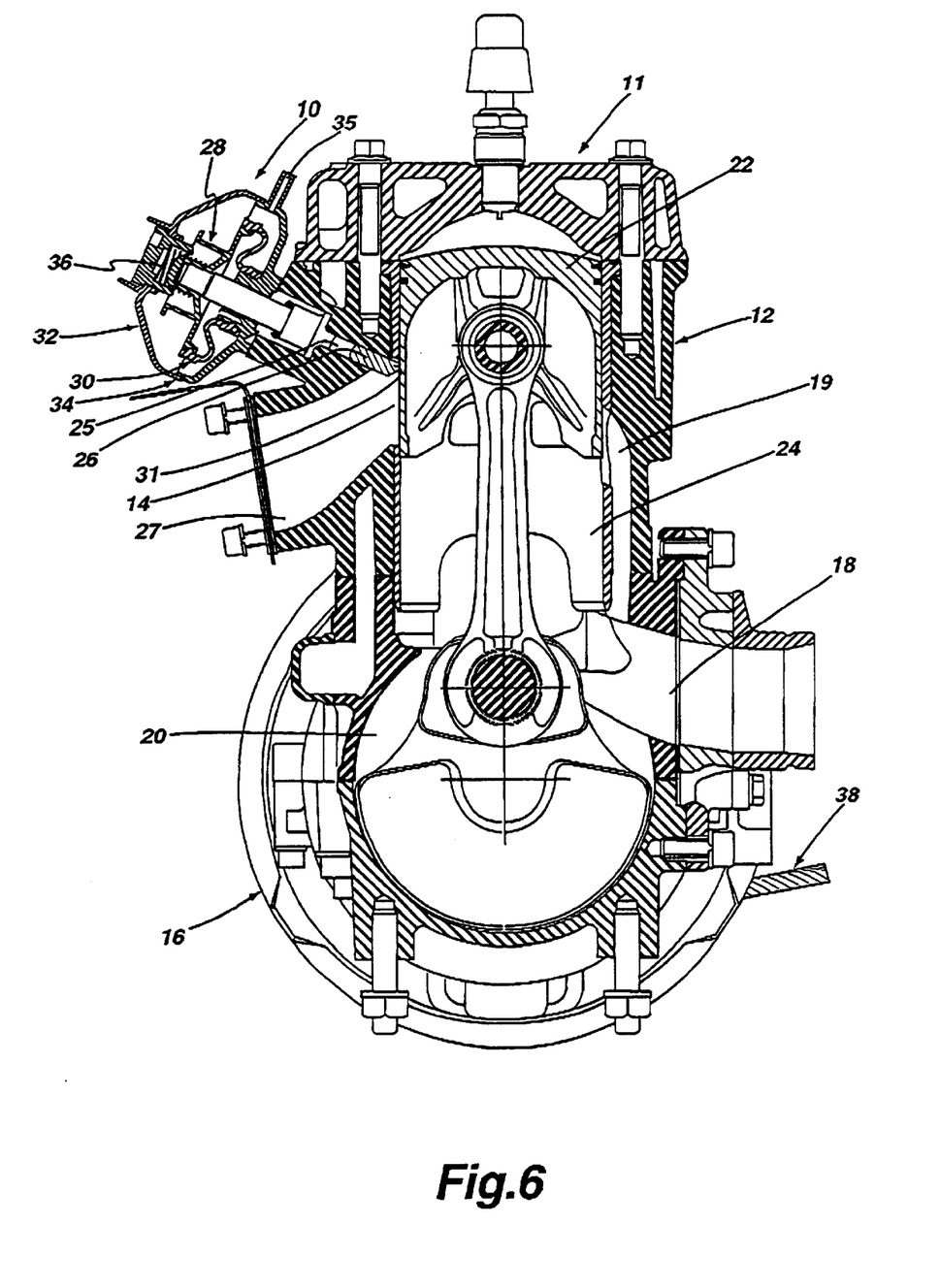
FIG. 6 is a cross-sectional view of a two-stroke engine with an exhaust port height adjustment valve assembly.

FIG. 6 illustrates the valve assembly 10 located adjacent a two-stroke engine 11. It is understood that the word "two-stroke engine" includes an engine having at least one cylinder such as a one, two, three or more cylinder engine. The engine 11 comprises a cylinder 12 having an exhaust port 14 and a crankcase 16 having an admission port 18 and an internal chamber 20. A piston 22 is reciprocable in the cylinder bore 24 and is adapted to open or close the exhaust port 14 and a transferring port 19. When the engine 11 is operating at low or medium speeds, the exhaust port 14 should not be exposed prematurely by the piston 22, as the latter moves downwardly. Such a premature exposure of the exhaust port 14 is prevented by a restricting member 26. This restricting member 26 is slidably mounted in a guide channel 25 having a longitudinal direction that is approximately radial with respect to cylinder bore 24 and extends at an acute angle to the axis of an exhaust passage 27. The exhaust passage 27 communicates with the exhaust port 14.

Figure 6A:
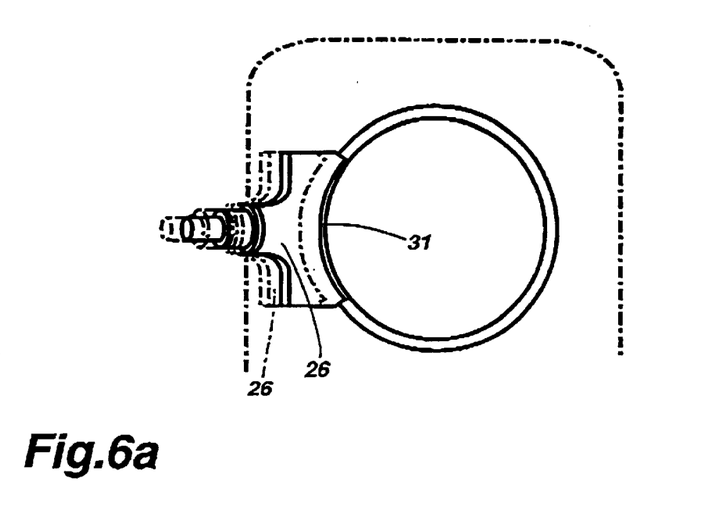
FIG. 6a is a schematic top plan view of the cylinder showing, in full line, the restricting member in the restrictive height position and in dotted line, the restricting member in the full flow height position.

The valve assembly 10 is adapted to actuate the restricting member 26 and comprises a valve piston 28 connected to the restricting member 26; a diaphragm 30 mounted with the valve piston 28 and gripped in the wall of the valve assembly 10 formed by a cover 32 and a valve housing 34; and a compression spring 36 which pushes on the restricting member 26 to maintain the restricting member 26 in a lower position wherein the edge 31 of the restricting member 26 protrudes into the exhaust port 14 and effectively lowers the height of the exhaust port This position of the restricting member 26 as shown in FIG. 6 and in full line in FIG. 6a is the restrictive height position.

Figure 7:
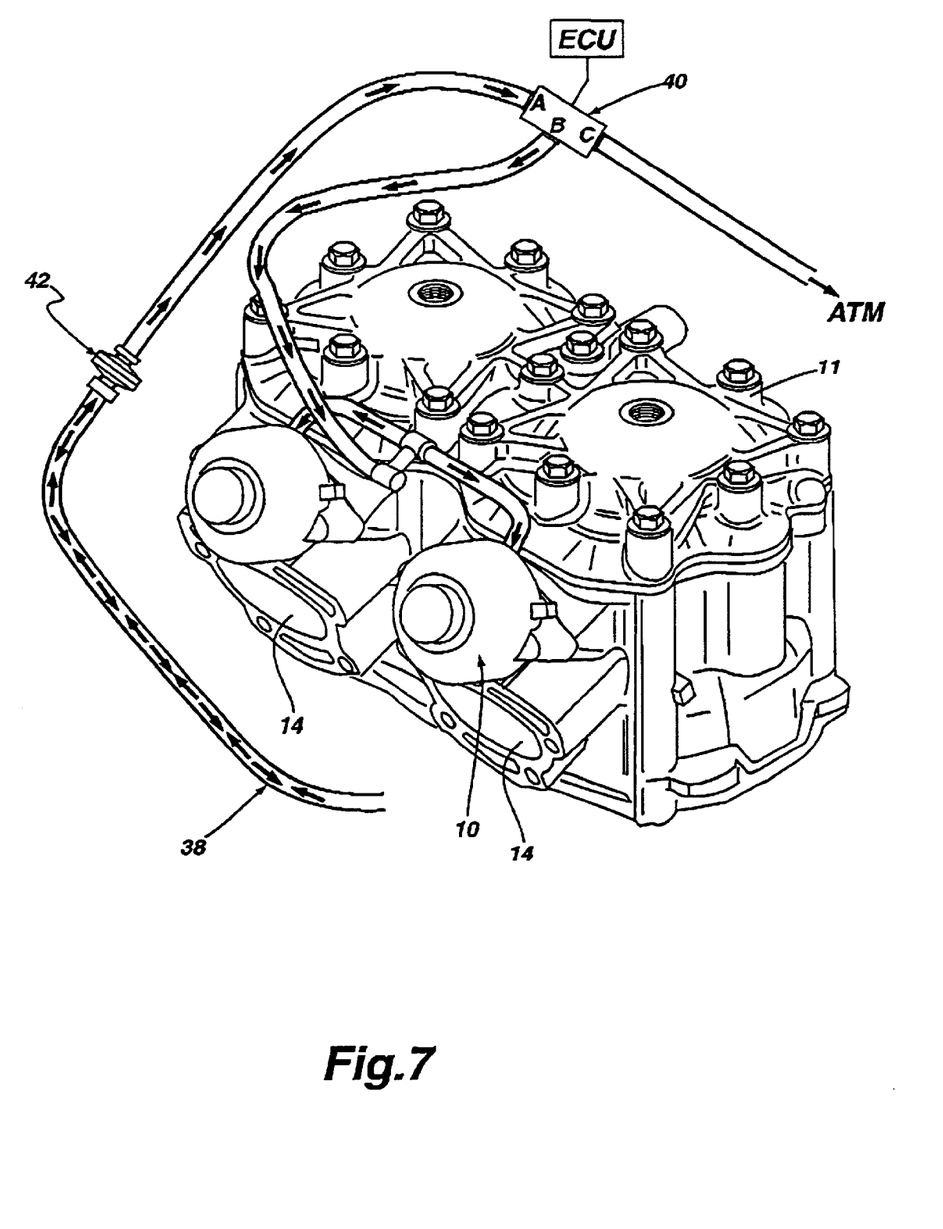
FIG. 7 is a perspective view of a two-stroke engine with an exhaust port height adjustment valve assembly system constructed in accordance with the present invention located adjacent a cylinder structure.

A port 35 located in the valve housing 34 is connected to the crankcase 16 through a conduit 38 (FIG. 7). The pressurized air from the internal chamber 20 of the crankcase 16 is thereby connected to the diaphragm 30. The compression spring 36 creates a pre-load on the valve piston 28 in order that the restricting member 26 stays at the restrictive height position, at which it restricts the upper portion of the exhaust port 14.

Referring now to FIG. 7, a solenoid-valve 40 and a check valve 42 are mounted onto conduit 38. The check valve 42 eliminates any negative pressure from the crankcase 16. The crankcase generates a positive pressure during the downstroke of the piston 22 and a vacuum (negative pressure) during the up stroke of the piston 22 as is shown by the arrows going in opposite directions in conduit 38 between the crankcase 16 and the check valve 42. The check valve 42 prevents the vacuum pressure from reaching the solenoid-valve 40 as the unidirectional arrows clearly show upstream from the check valve 42. The solenoid-valve 40 is adapted to, in a first position, direct pressurized air from the internal chamber 20 to the valve assembly 10, in a second position, open the valve assembly 10 to the ambient air and prevent the pressurized air from the internal chamber 20 from reaching the valve assembly 10 and in a third position, block all circulation. The solenoid-valve 40 includes a first port "A" connected to the internal chamber 20 of the crankcase 16, a second port "B" connected to the valve assembly 10, and a third port "C" connected to the ambient air (atmospheric pressure). The solenoid-valve 40 is adapted to
1—link its port "A" and "B" leaving port "C" closed,
2—link its port "B" and "C" leaving port "A" closed,
3—close ports "A", "B" and "C".

An Electronic Control Unit, commonly called an ECU, is connected to the solenoid-valve 40 and controls the various positions the solenoid-valve 40 may adopted. The ECU measures engine speed N and throttle opening (load condition) of the engine 11. As it is well known in the state of the art, the throttle opening may be measured at the throttle valve located on the carburettor, such carburettor controlling fuel supplies to the engine 11 or at any other suitable location. As well, engine speed N is a common measurement in engine operation.

In operation, the restricting member 26 is the restrictive height position. When the engine speed N increases to a predetermined N value specific to a particular throttle opening, it is necessary to provide a higher opening of the exhaust port 14 in order to increase power output. To this end, the ECU activates the solenoid-valve 40 to direct the pressurized air to the valve assembly 10 (as shown with arrows in FIG. 7) which actuates the restricting member 26 towards the full-flow height position. FIG. 6a represent in dotted lines, the full-flow height position of the restricting member 26. The engine speed N may then decrease to a predetermined N value specific to a particular throttle opening, which may not be the same as the one previously attained to activate the restricting member 26 due to a different throttle opening, at which N value, it will be necessary to delay the exposure of the exhaust port 14 by returning the restricting member 26 to its restrictive height position in order to optimize fuel consumption and power output below that predetermined engine speed N. To this effect, the ECU activates the solenoid-valve 40 to close port "A" and open port "B" and "C" thereby blocking the pressurized air from the internal chamber 20 and opening the valve assembly 10 to the atmosphere which has the effect of returning the restricting member 26 to its restrictive height position.

It is desirable to use the rate of acceleration of the engine, in order to reduce or eliminate the delay between the opening of port "A" and "B" of the solenoid-valve 40 and the actuation of the restricting member 26. Even if this delay is small, there is always a delay between the solenoid-valve 40 actuation and the response by the restricting member 26 due to the supplying capacity of the pressure source and the inertia of the restricting member 26. Thus, it is desirable to activate the solenoid-valve 40 earlier when very high acceleration occurs. If the rate of acceleration of the engine 11 is very high (for instance 10000 RPM/sec), the solenoid-valve 40 should open earlier than the predetermined engine speed N for the specific throttle opening. In this particular situation, the ECU could activate the solenoid-valve 40 some 500 RPM before the predetermined engine speed N to account for the response delay of the restrictive member 26. The ECU thus actuates the valve assembly 10 according to engine speed N, throttle opening and rate of acceleration of the engine.

Figure 8:
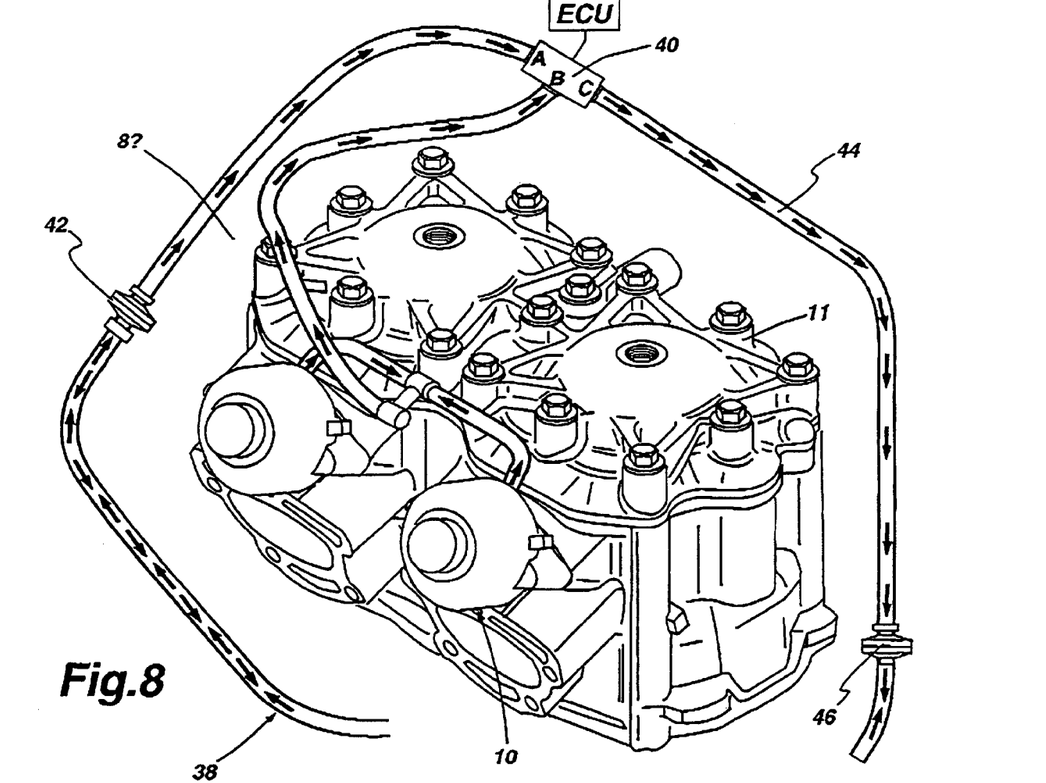
FIG. 8 is a perspective view of a two-stroke engine with an exhaust port height adjustment valve assembly system constructed in accordance with the present invention located adjacent a cylinder structure wherein a vacuum pipe is mounted between the solenoid-valve and the crankcase.

As illustrated in FIG. 8, instead of opening the valve assembly 10 to the atmosphere, a vacuum pipe 44 may be mounted which links the solenoid-valve 40 back to the crankcase 16 in order to use the previously described negative pressure created in the crankcase for increasing the speed at which the pressurized air is evacuated from the valve assembly 10. Thus increasing the speed at which the restricting member 26 returns to its restrictive height position. Advantageously, if port "B" and "C" of the solenoid-valve 40 remain open at low engine speeds, the compression spring 36 may be smaller because this negative pressure will help in keeping the restricting member 26 at its restrictive height position. A check valve 46 is added, downstream of the solenoid-valve 40 to eliminate the positive pressure created in the crankcase 16 by the down stroke of the piston 22.

Figure 9:
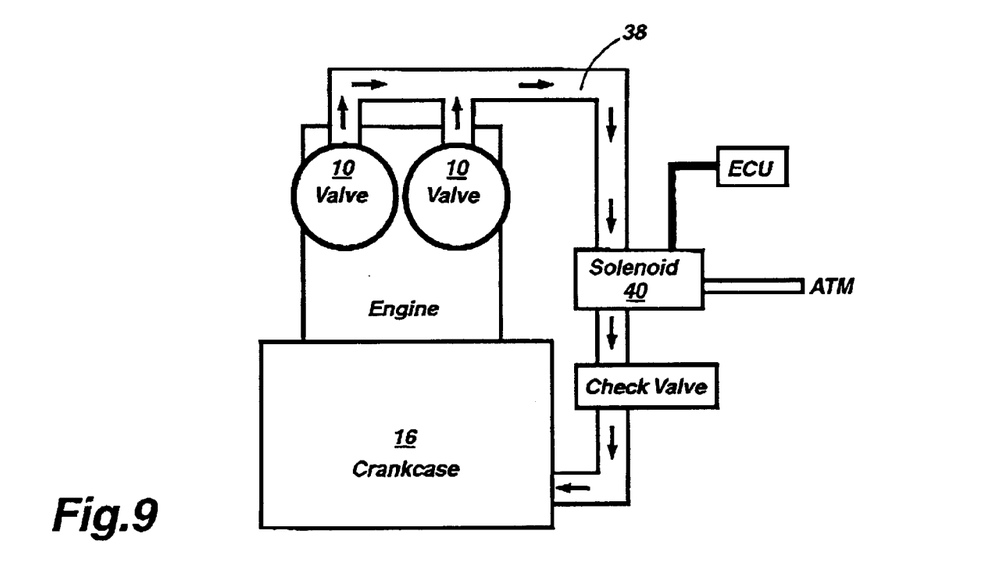
FIG. 9 is a diagrammatic view of an engine with an exhaust port height adjustment valve assembly system constructed in accordance with a first variant of the invention.

FIG. 9 illustrates an exhaust port height adjustment system constructed in accordance with a first variant. A vacuum, instead of pressurized air, may be used to activate the restricting member 26. Indeed, while the valve assembly 10 uses the pressurized mixture created when the piston 22 descends, the vacuum created when the piston 22 ascends may also be used. Obviously, the valve assembly 10 would have its port 35 connecting with the upper part of the diaphragm 30 in order to actuate the restricting member 26 towards the full-flow height position when the vacuum pressure is directed to the valve assembly 10. A check valve is also necessary to eliminate the positive pressure created in the crankcase 16. When the vacuum is blocked by the solenoid-valve 40, the spring 36 applies the necessary force to return or to maintain the restricting member 26 at its restrictive height position.

Figure 10:
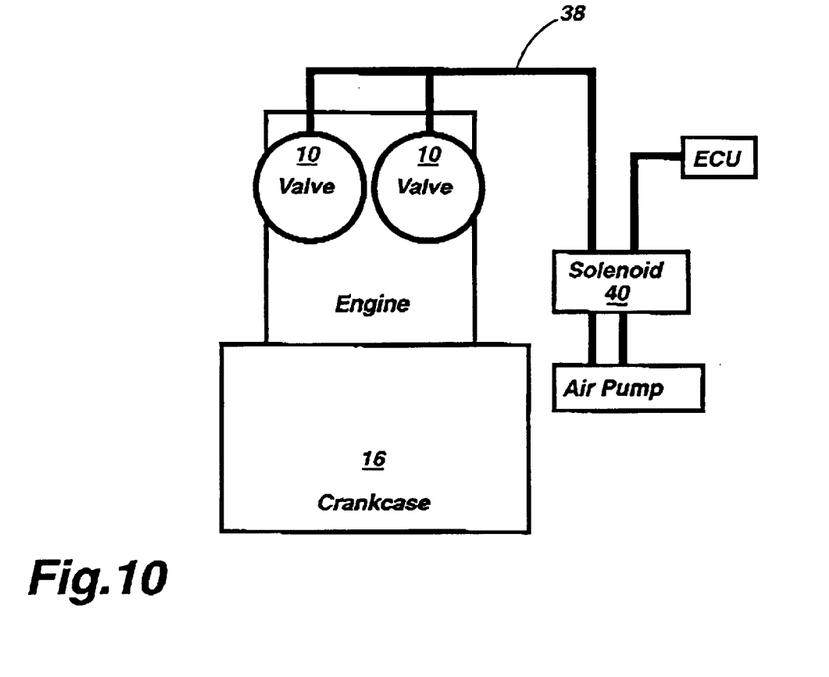
FIG. 10 is a diagrammatic view of an engine with an exhaust port height adjustment valve assembly system constructed in accordance with a second variant of the invention.

FIG. 10 illustrates an exhaust port height adjustment system constructed in accordance with a second variant wherein an air pump is used, such air pump providing the pressurized air to the valve assembly 10 instead of using the pressurized air from the crankcase 16. The system operates essentially in the same manner as previously described. However the solenoid-valve 40 always provide an exit to the pressurized air to avoid pressure build up and possible damages to components of the system. In this variant, no check valve is necessary.

Figure 11:
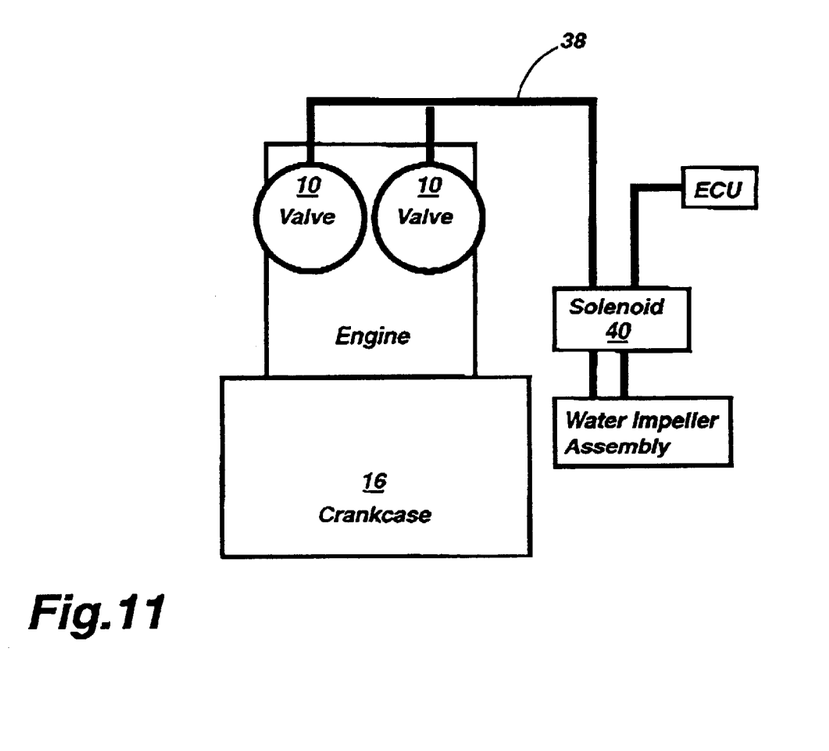
FIG. 11 is a diagrammatic view of an engine with an exhaust port height adjustment valve assembly system constructed in accordance with a third variant of the invention.

Finally, FIG. 11 illustrates an exhaust port height adjustment system constructed in accordance with a third variant wherein water under pressure is used instead of pressurized air. Again, the system operates essentially in the same manner as the second variant wherein the solenoid-valve always provide an exit to the pressurized water to avoid pressure build up and possible damages to components of the system. In this variant, no check valve is necessary.

It is understood that the dimension of the diaphragm 30 and the characteristic of the spring 36 are determined in accordance with the type of the pressure or vacuum source used to actuate the restricting member 26 of the valve assembly 10.

It is also understood that while the invention may include a mounted solenoid-valve and/or a mounted Electronic Control Unit, commonly called an ECU, such solenoid-valve and/or such ECU may be located adjacent the engine and/or the valve assembly instead to be mounted thereon.

The above description of the preferred embodiment should not be interpreted in any limiting manner since variations and refinements are possible which are within the spirit and scope of the present invention. The scope of the invention is defined in the appended claims.

I claim:

1. A two-stroke engine including:
   a cylinder structure having an inside peripheral wall which defines a cylinder bore with an exhaust port;
   a piston axially reciprocable in said cylinder bore and adapted to open and close said exhaust port;
   a crankcase connected to said cylinder structure including an inside wall which defines an internal chamber;
   said engine, in operation, producing an engine speed N;
   wherein the improvement comprises:
   an exhaust port height adjustment system comprising:
   a valve assembly located adjacent said cylinder structure and including a restricting member mounted in said cylinder structure adjacent to said exhaust port and adjustable between a full-flow height, at which position said restricting member exposes said exhaust port throughout its axial extent, and a restrictive height, at which position said restricting member restricts the axial extent of said exhaust port, said valve assembly being selectively connected to a pressure source, said pressure source producing a pressurized medium; wherein in operation, said valve assembly is adapted to actuate and control the position of said restricting member with said pressurized medium according to said engine speed N and a rate of acceleration of said engine speed.

2. A two-stroke engine as defined in claim 1, wherein said exhaust port height adjustment system further comprises a solenoid-valve adapted in operation to direct or block said pressurized medium from said pressure source to or from said valve assembly; said pressurized medium actuating said restricting member when said solenoid-valve directs said pressurized medium to said valve assembly.

3. A two-stroke engine as defined in claim 2, wherein said exhaust port height adjustment system further comprises an Electronic Control Unit ("ECU"), said ECU being adapted to measure the engine speed N and to activate said solenoid-valve according to said engine speed N, whereby said valve assembly actuates said restricting member when said ECU activates said solenoid-valve.

4. A two-stroke engine as defined in claim 3, wherein said ECU is further adapted to measure a throttle opening and to activate said solenoid valve according to said engine speed N and said throttle opening.

5. A two-stroke engine as defined in claim 4, wherein said ECU is further adapted to measure the rate of acceleration of said engine speed N and to activate said solenoid-valve according to said engine speed N, said throttle opening and said rate of acceleration.

6. A two-stroke engine as defined in claim 1, wherein said pressure source is said internal chamber of said crankcase.

7. A two-stroke engine as defined in claim 6, wherein said pressurized medium is a positive air pressure created in said internal chamber.

8. A two-stroke engine as defined in claim 1, wherein said pressure source is an air pump.

9. A two-stroke engine including:
   a cylinder structure having an inside peripheral wall which defines a cylinder bore with an exhaust port;
   a piston axially reciprocable in said cylinder bore and adapted to open and close said exhaust port;
   a crankcase connected to said cylinder structure including an inside wall which defines an internal chamber;
   wherein the improvement comprises:
      an exhaust port height adjustment system comprising:
         a valve assembly located adjacent said cylinder structure and including a restricting member mounted in said cylinder structure adjacent to said exhaust port and adjustable between a full-flow height, at which position said restricting member exposes said exhaust port throughout its axial extent, and a restrictive height, at which position said restricting member restricts the axial extent of said exhaust port, said valve assembly being connected to a pressure source, said pressure source producing a pressurized medium; wherein in operation, said valve assembly is adapted to actuate and control the position of said restricting member with said pressurized medium,
      wherein said valve assembly further comprises a diaphragm connected to said restricting member and said pressurized medium, when directed towards a first side of said diaphragm, applies a force on said diaphragm thereby actuating said restricting member from one of said restrictive height and said full-flow height to the other of said restrictive height and said full-flow height, said first side of said diaphragm also selectively connectable to a vacuum source by a pressure controller and a vacuum pipe to evacuate the pressurized medium from the first side of the diaphragm to increase a speed at which the restricting member returns to said one of said restrictive height and said full-flow height.

10. A two-stroke engine as defined in claim 9, wherein said exhaust port height adjustment system further comprises a solenoid-valve as the pressure controller, the solenoid-valve adapted in operation to direct or block said pressurized medium from said pressure source to or from said valve assembly; said pressurized medium actuating said restricting member when said solenoid-valve directs said pressurized medium to said valve assembly.

11. A two-stroke engine as defined in claim 10, wherein said exhaust port height adjustment system further comprises an Electronic Control Unit ("ECU"), said ECU being adapted to measure the engine speed N and to activate said solenoid-valve according to said engine speed N, whereby said valve assembly actuates said restricting member when said ECU activates said solenoid-valve.

12. A two-stroke engine as defined in claim 11, wherein said ECU is further adapted to measure a throttle opening and to activate said solenoid valve according to said engine speed N and said throttle opening.

13. A two-stroke engine as defined in claim 12, wherein said ECU is further adapted to measure the rate of acceleration of said engine speed N and to activate said solenoid-valve according to said engine speed N, said throttle opening and said rate of acceleration.

14. A two-stroke engine as defined in claim 9, wherein said pressure source is said internal chamber of said crankcase and said pressurized medium is a positive air pressure created in said internal chamber.

15. A two-stroke engine including:
   a cylinder structure having an inside peripheral wall which defines a cylinder bore with an exhaust port;
   a piston axially reciprocable in said cylinder bore and adapted to open and close said exhaust port;
   a crankcase connected to said cylinder structure including an inside wall which defines an internal chamber;
   said engine, in operation, producing an engine speed N;
   wherein the improvement comprises:
      an exhaust port height adjustment system comprising:
         a valve assembly located adjacent said cylinder structure and including a restricting member mounted in said cylinder structure adjacent to said exhaust port and adjustable between a full-flow height, at which position said restricting member exposes said exhaust port throughout its axial extent, and a restrictive height, at which position said restricting member restricts the axial extent of said exhaust port, said valve assembly being selectively connected to a pressure source, said pressure source producing a pressurized medium; wherein in operation, said valve assembly is adapted to actuate and control the position of said restricting member with said pressurized medium, said pressure source being said internal chamber of said crankcase and said pressurized medium being a lower than atmospheric air pressure created in said internal chamber.

16. A two-stroke engine as defined in claim 15, wherein said exhaust port height adjustment system further comprises a solenoid-valve adapted in operation to direct or block said pressurized medium from said pressure source to or from said valve assembly; said pressurized medium actuating said restricting member when said solenoid-valve directs said pressurized medium to said valve assembly.

17. A two-stroke engine as defined in claim 16, wherein said exhaust port height adjustment system further comprises an Electronic Control Unit ("ECU"), said ECU being adapted to measure the engine speed N and to activate said solenoid-valve according to said engine speed N, whereby said valve assembly actuates said restricting member when said ECU activates said solenoid-valve.

18. A two-stroke engine as defined in claim 17, wherein said ECU is further adapted to measure a throttle opening and to activate said solenoid valve according to said engine speed N and said throttle opening.

19. A two-stroke engine as defined in claim 18, wherein said ECU is further adapted to measure the rate of acceleration of said engine speed N and to activate said solenoid-valve according to said engine speed N, said throttle opening and said rate of acceleration.

20. A two-stroke engine including:
   a cylinder structure having an inside peripheral wall which defines a cylinder bore with an exhaust port;
   a piston axially reciprocable in said cylinder bore and adapted to open and close said exhaust port;
   a crankcase connected to said cylinder structure including an inside wall which defines an internal chamber;
   said engine, in operation, producing an engine speed N;
   wherein the improvement comprises:
      an exhaust port height adjustment system comprising:

a valve assembly located adjacent said cylinder structure and including a restricting member mounted in said cylinder structure adjacent to said exhaust port and adjustable between a full-flow height, at which position said restricting member exposes said exhaust port throughout its axial extent, and a restrictive height, at which position said restricting member restricts the axial extent of said exhaust port, said valve assembly being selectively connected to a pressure source, said pressure source producing a pressurized medium; wherein in operation, said valve assembly is adapted to actuate and control the position of said restricting member with said pressurized medium, said pressure source being a water impeller assembly.

21. A two-stroke engine as defined in claim 20, wherein said pressurized medium is water under pressure.

22. A two-stroke engine as defined in claim 20, wherein said exhaust port height adjustment system further comprises a solenoid-valve adapted in operation to direct or block said pressurized medium from said pressure source to or from said valve assembly; said pressurized medium actuating said restricting member when said solenoid-valve directs said pressurized medium to said valve assembly.

23. A two-stroke engine as defined in claim 22, wherein said exhaust port height adjustment system further comprises an Electronic Control Unit ("ECU"), said ECU being adapted to measure the engine speed N and to activate said solenoid-valve according to said engine speed N, whereby said valve assembly actuates said restricting member when said ECU activates said solenoid-valve.

24. A two-stroke engine as defined in claim 23, wherein said ECU is further adapted to measure a throttle opening and to activate said solenoid valve according to said engine speed N and said throttle opening.

25. A two-stroke engine as defined in claim 24, wherein said ECU is further adapted to measure the rate of acceleration of said engine speed N and to activate said solenoid-valve according to said engine speed N, said throttle opening and said rate of acceleration.

26. An exhaust port height adjustment system comprising: a valve assembly adapted to be located adjacent an engine cylinder and including a restricting member mountable in said cylinder adjacent an exhaust port of the cylinder and adjustable between a full-flow height, at which position said restricting member exposes said exhaust port throughout its axial extent, and a restrictive height, at which position said restricting member restricts the axial extent of said exhaust port, said valve assembly being selectively connected to a pressure source, said pressure source producing a pressurized medium; wherein in operation, said valve assembly is adapted to actuate and control the position of said restricting member with said pressurized medium according to an engine speed N and a rate of acceleration of said engine speed.

27. An exhaust port height adjustment system as defined in claim 26 further comprising a solenoid-valve adapted in operation to direct or block said pressured medium from said pressure source to or from said valve assembly; said pressurized medium actuating said restricting member when said pressurized medium is directed from said pressure source to said valve assembly.

28. An exhaust port height adjustment system as defined in claim 27 further comprising an Electronic Control Unit ("ECU"), said ECU being adapted to measure the engine speed N and to activate said solenoid-valve according to said engine speed N, whereby said valve assembly actuates said restricting member when said ECU activates said solenoid-valve.

29. An exhaust port height adjustment system as defined in claim 28, wherein said ECU is further adapted to measure an engine throttle opening and to activate said solenoid-valve according to said engine speed N and said throttle opening.

30. An exhaust port height adjustment system as defined in claim 29, wherein said ECU is further adapted to measure the rate of acceleration of said engine speed N and to activate said solenoid-valve according to said engine speed N, said throttle opening and said rate of acceleration.

31. An exhaust port height adjustment system as defined in claim 26, wherein said pressure source is an internal chamber of a crankcase of said engine.

32. An exhaust port height adjustment system as defined in claim 31 wherein said pressurized medium is a positive air pressure created in said internal chamber.

33. An exhaust port height adjustment system as defined in claim 26, wherein said pressure source is an air pump.

34. An exhaust port height adjustment system comprising: a valve assembly adapted to be located adjacent an engine cylinder and including a restricting member mountable in said cylinder adjacent an exhaust port of the cylinder and adjustable between a full-flow height, at which position said restricting member exposes said exhaust port throughout its axial extent, and a restrictive height, at which position said restricting member restricts the axial extent of said exhaust port, said valve assembly being selectively connected to a pressure source, said pressure source producing a pressurized medium; wherein in operation, said valve assembly is adapted to actuate and control the position of said restricting member with said pressurized medium, wherein said valve assembly further comprises a diaphragm connected to said restricting member and said pressurized medium from said pressure source, when directed towards a first side of said diaphragm, applies a force on said diaphragm thereby actuating said restricting member from one of said restrictive height and said full-flow height to the other of said restrictive height and said full-flow height, said first side of said diaphragm also selectively connectable to a vacuum source by a pressure controller and a vacuum pipe to evacuate the pressurized medium from the first side of the diaphragm to increase a speed at which the restricting member returns to said one of said restrictive height and said full-flow height.

35. An exhaust port height adjustment system as defined in claim 34, wherein said exhaust port height adjustment system further comprises a solenoid-valve as the pressure controller, the solenoid-valve adapted in operation to direct or block said pressurized medium from said pressure source to or from said valve assembly; said pressurized medium actuating said restricting member when said solenoid-valve directs said pressurized medium to said valve assembly.

36. An exhaust port height adjustment system as defined in claim 35, wherein said exhaust port height adjustment system further comprises an Electronic Control Unit ("ECU"), said ECU being adapted to measure the engine speed N and to activate said solenoid-valve according to said engine speed N, whereby said valve assembly actuates said restricting member when said ECU activates said solenoid-valve.

37. An exhaust port height adjustment system as defined in claim 36, wherein said ECU is further adapted to measure a throttle opening and to activate said solenoid valve according to said engine speed N and said throttle opening.

38. An exhaust port height adjustment system as defined in claim 37, wherein said ECU is further adapted to measure the rate of acceleration of said engine speed N and to activate said solenoid-valve according to said engine speed N, said throttle opening and said rate of acceleration.

39. An exhaust port height adjustment system as defined in claim 34, wherein said pressure source is said internal chamber of said crankcase and said pressurized medium is a positive air pressure created in said internal chamber.

40. An exhaust port height adjustment system comprising: a valve assembly adapted to be located adjacent an engine cylinder and including a restricting member mountable in said cylinder adjacent an exhaust port of the cylinder and adjustable between a full-flow height, at which position said restricting member exposes said exhaust port throughout its axial extent, and a restrictive height, at which position said restricting member restricts the axial extent of said exhaust port, said valve assembly being selectively connected to a pressure source, said pressure source producing a pressurized medium; wherein in operation, said valve assembly is adapted to actuate and control the position of said restricting member with said pressurized medium, said pressurized medium being a lower than atmospheric air pressure created in an internal chamber.

41. An exhaust port height adjustment system as defined in claim 40, wherein said exhaust port height adjustment system further comprises a solenoid-valve adapted in operation to direct or block said pressurized medium from said pressure source to or from said valve assembly; said pressurized medium actuating said restricting member when said solenoid-valve directs said pressurized medium to said valve assembly.

42. An exhaust port height adjustment system as defined in claim 41, wherein said exhaust port height adjustment system further comprises an Electronic Control Unit ("ECU"), said ECU being adapted to measure the engine speed N and to activate said solenoid-valve according to said engine speed N, whereby said valve assembly actuates said restricting member when said ECU activates said solenoid-valve.

43. An exhaust port height adjustment system as defined in claim 42, wherein said ECU is further adapted to measure a throttle opening and to activate said solenoid valve according to said engine speed N and said throttle opening.

44. An exhaust port height adjustment system as defined in claim 43, wherein said ECU is further adapted to measure the rate of acceleration of said engine speed N and to activate said solenoid-valve according to said engine speed N, said throttle opening and said rate of acceleration.

45. An exhaust port height adjustment system comprising: a valve assembly adapted to be located adjacent an engine cylinder and including a restricting member mountable in said cylinder adjacent an exhaust port of the cylinder and adjustable between a full-flow height, at which position said restricting member exposes said exhaust port throughout its axial extent, and a restrictive height, at which position said restricting member restricts the axial extent of said exhaust port, said valve assembly being selectively connected to a pressure source, said pressure source producing a pressurized medium; wherein in operation, said valve assembly is adapted to actuate and control the position of said restricting member with said pressurized medium, said pressure source being a water impeller assembly.

46. An exhaust port height adjustment system as defined in claim 45, wherein said pressurized medium is water under pressure.

47. An exhaust port height adjustment system as defined in claim 45, wherein said exhaust port height adjustment system further comprises a solenoid-valve adapted in operation to direct or block said pressurized medium from said pressure source to or from said valve assembly; said pressurized medium actuating said restricting member when said solenoid-valve directs said pressurized medium to said valve assembly.

48. An exhaust port height adjustment system as defined in claim 47, wherein said exhaust port height adjustment system further comprises an Electronic Control Unit ("ECU"), said ECU being adapted to measure the engine speed N and to activate said solenoid-valve according to said engine speed N, whereby said valve assembly actuates said restricting member when said ECU activates said solenoid-valve.

49. An exhaust port height adjustment system as defined in claim 48, wherein said ECU is further adapted to measure a throttle opening and to activate said solenoid valve according to said engine speed N and said throttle opening.

50. An exhaust port height adjustment system as defined in claim 49, wherein said ECU is further adapted to measure the rate of acceleration of said engine speed N and to activate said solenoid-valve according to said engine speed N, said throttle opening and said rate of acceleration.

\* \* \* \* \*